United States Patent [19]

Chonan

[11] Patent Number: 5,398,954
[45] Date of Patent: Mar. 21, 1995

[54] WHEEL SUSPENSION TYPE FRONT FORK AND MANUFACTURING METHOD OF SLIDING TUBE THEREOF

[75] Inventor: Yoshiya Chonan, Toride, Japan
[73] Assignee: SR Suntour Inc., Ibaragi, Japan
[21] Appl. No.: 92,353
[22] Filed: Jul. 15, 1993
[51] Int. Cl.⁶ ............................................. B62K 25/08
[52] U.S. Cl. .................................... 280/276; 280/277
[58] Field of Search ............... 280/276, 277, 279, 280

[56] References Cited
U.S. PATENT DOCUMENTS

2,670,218 2/1954 Rokahr ................................. 280/276
5,195,766 3/1993 Dohrmann et al. ................. 280/276

Primary Examiner—Mitchell J. Hill
Attorney, Agent, or Firm—Whitham, Curtis, Whitham & McGinn

[57] ABSTRACT

A wheel suspension type front fork has a structure capable of being manufactured without a metal mold and cutting work. An inner tube 18 is disposed to a sliding tube 13 to form a dual-tube structure. A receiving plate 19 is supported by an upper end of the inner tube 18 and an axle receiver 25 of the sliding tube 13 is reinforced by a lower end of the inner tube 18.

1 Claim, 7 Drawing Sheets

WHEEL SUSPENSION TYPE FRONT FORK AND MANUFACTURING METHOD OF SLIDING TUBE THEREOF

BACKGROUND OF THE INVENTION

1. Field of the Invention

The present invention relates to a wheel suspension type front fork of bicycles or other two-wheeled vehicles and a manufacturing method of a sliding tube constituting the front fork.

2. Description of the Related Art

Bicycles or the like adopt the wheel suspension type front fork in order to absorb a shock when a front wheel runs on a difference in level.

Figure 6A:
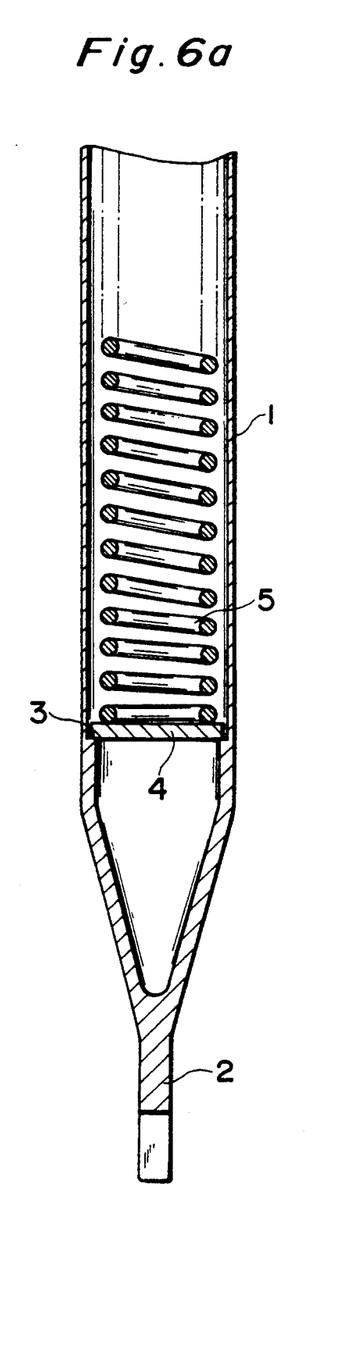
FIGS. 6(a) and (b) are a sectional view and a front view illustrating of a sliding tube of a conventional wheel suspension type front fork, respectively.
Figure 6B:
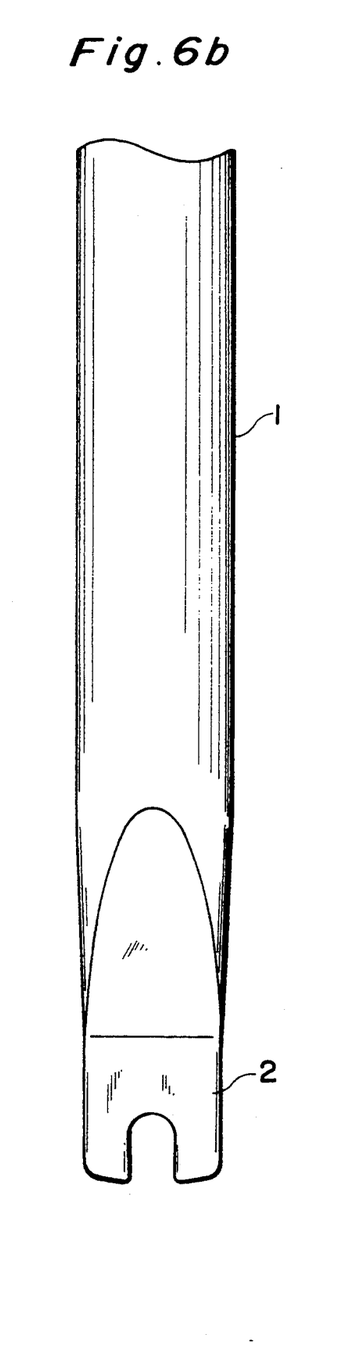

FIGS. 6(a) and (b) illustrate an example of a conventional wheel suspension type front fork. The front fork includes a sliding tube 1 having an upper portion which is fit slidably to a supporting tube not shown and a lower portion which is formed with a thick axle receiver 2 including a recess for supporting an axle of the front wheel. A step 3 is formed on an inner periphery at a lower portion of the sliding tube 1 and a disklike receiving plate 4 is engaged on the step 3. A lower end of a coil spring 5 abuts against the receiving plate 4 and an upper end of the coil spring 5 abuts against a spring receiving member (not shown) which is fit and fixed to a lower portion of the supporting tube. The coil spring 5 and the receiving plate 4 constitute a portion of a shock absorber. Accordingly, the force of shock can be absorbed by moving up and down the sliding tube 1 by expansion and contraction of the coil spring 5.

Figure 7A:
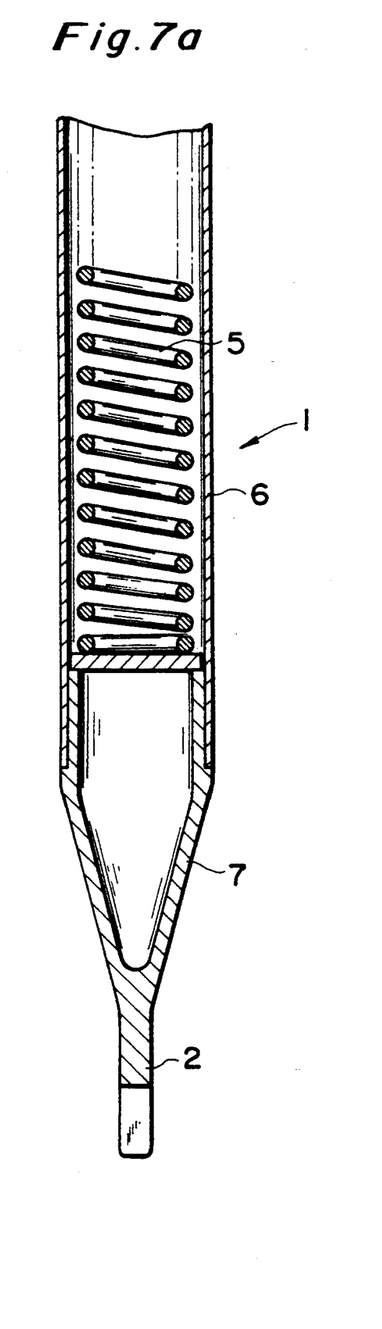
FIGS. 7(a) and (b) is a sectional view and a front view illustrating another sliding tube of the conventional front fork, respectively.
Figure 7B:
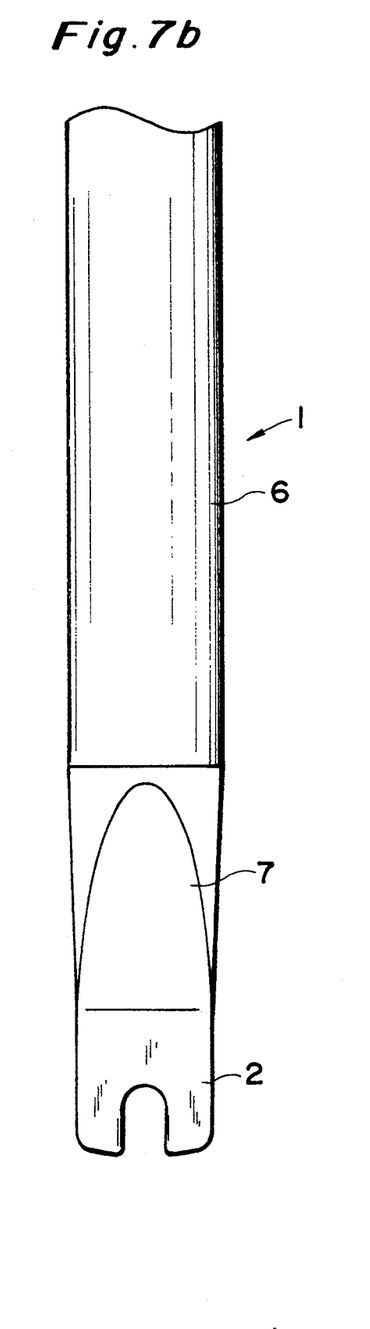

FIGS. 7(a) and (b) illustrate an example of another conventional wheel suspension type front fork. A sliding tube 1 of the front fork includes a tube portion 6 and an axle receiving portion 7. An upper cylindrical portion of the axle receiving portion 7 is fit into a lower portion of the tube portion 6 and joined thereto with adhesive or by brazing.

With the front fork shown in FIG. 6, the sliding tube 1 is integrally formed to the axle receiver 2 by means of casting or forging and the step 3 for supporting the receiving plate 4 is formed by cutting the inner surface of the sliding tube 1. Accordingly, the conventional front fork requires an expensive metal mold and associated facilities as well as the cutting technique accompanied with difficulties in work. Thus, the front fork itself is very expensive.

Further, with the front fork shown in FIG. 7, since a metal mold and associated facilities for casting or forging are required similarly in order to form the axle receiving portion 7, the front fork is expensive, and since there is a possibility that the axle receiving portion 7 is separated from the tube 6 when the force of shock is added, it is necessary to secure the joining strength thereof and accordingly the joining work requires much labor and attention.

In addition, in the front fork shown in FIGS. 6 and 7, every time the design and specification thereof are modified, a metal mold must be provided and the cost of equipment is increased.

SUMMARY OF THE INVENTION

It is an object of the present invention to provide a wheel suspension type front fork capable of being manufactured easily without a metal mold and having excellent strength and a manufacturing method of a sliding tube thereof.

According to the present invention, the wheel suspension type front fork including a pair of supporting tubes fixedly mounted to the side of a steering tube, a pair of sliding tubes each having an axle receiver and slidably fit onto the supporting tube and shock absorbers disposed in the tubes, is characterized in that an inner tube is fixedly disposed in a lower portion of each of the sliding tubes to form a dual-tube structure and the inner tube includes an lower end forming a reinforcement of the axle receiver and an upper end forming a support of the shock absorber.

The manufacturing method according to the present invention is characterized in that tube material is used as the sliding tube and the inner tube is inserted into an end of the tube material, the inserted end being squeezed to form the axle receiver.

Since the inner tube is disposed within the sliding tube to form a dual-tube structure and the upper end and the lower end of the inner tube are utilized as the support of the shock absorber and as the reinforcement of the axle receiver, respectively, only tile combination of commercially available tube material and inner tube material having a small diameter constitute the sliding tube having excellent mechanical strength and which does not require the cutting work and the metal mold.

Further, since the sliding tube is manufactured by inserting the inner tube into the tube material and squeezing it to form the axle receiver, the manufacturing is very simple.

According to the present invention, since the inner tube is inserted into the tube material and squeezed so that the sliding tube is formed into a dual-tube structure in which the axle receiving portion is reinforced by the lower end of the inner tube and the shock absorber is supported by the upper end of the inner tube, there can be provided the inexpensive wheel suspension type front fork which does not require a metal mold and its facilities as well as cutting work and which includes the axle receiving portion having excellent mechanical strength. Further, the wheel suspension type front fork which can cope with the modification in design or specification can be manufactured by selecting the tube material.

DESCRIPTION OF THE PREFERRED EMBODIMENTS

Embodiments of the present invention are now described in detail with reference to the accompanying drawings.

Figure 1A:
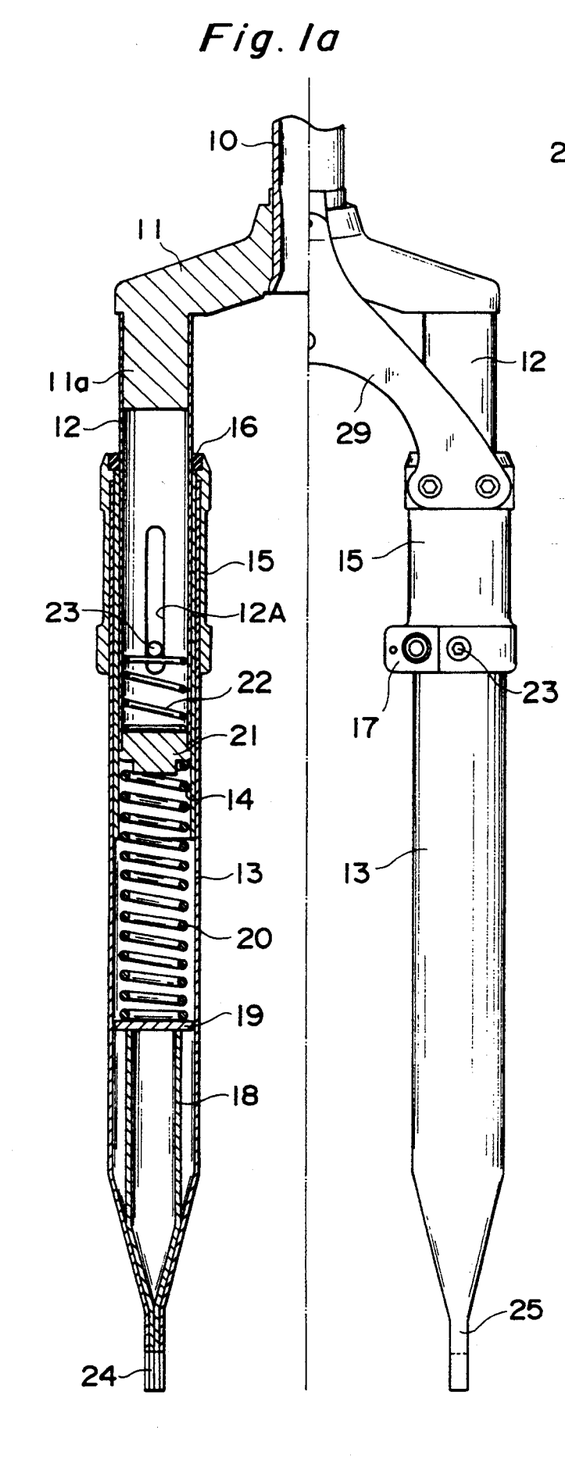
FIGS. 1(a) and (b) are a partially sectional front view and a side view illustrating an example of a wheel suspension type front fork according to the present invention, respectively.
Figure 1B:
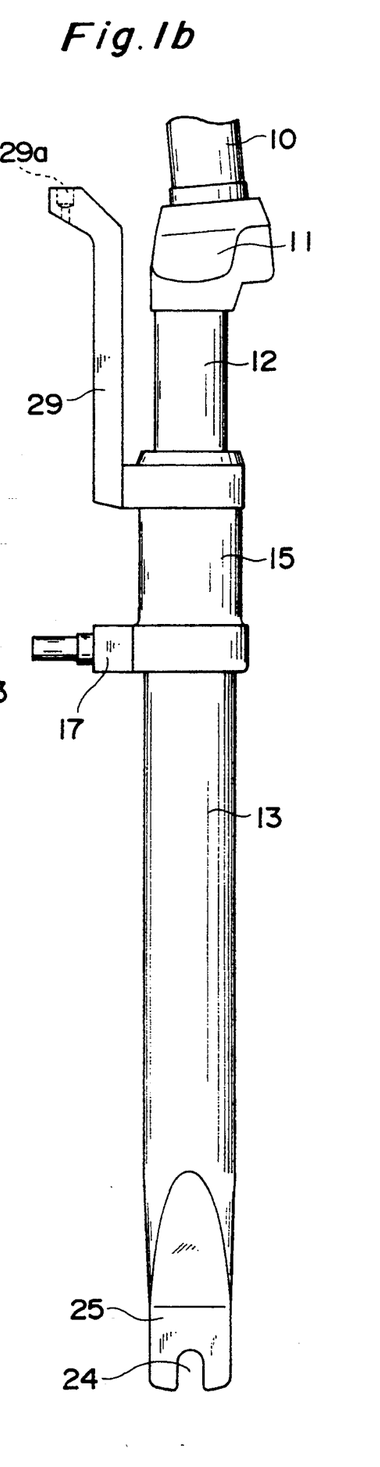
Figure 2:
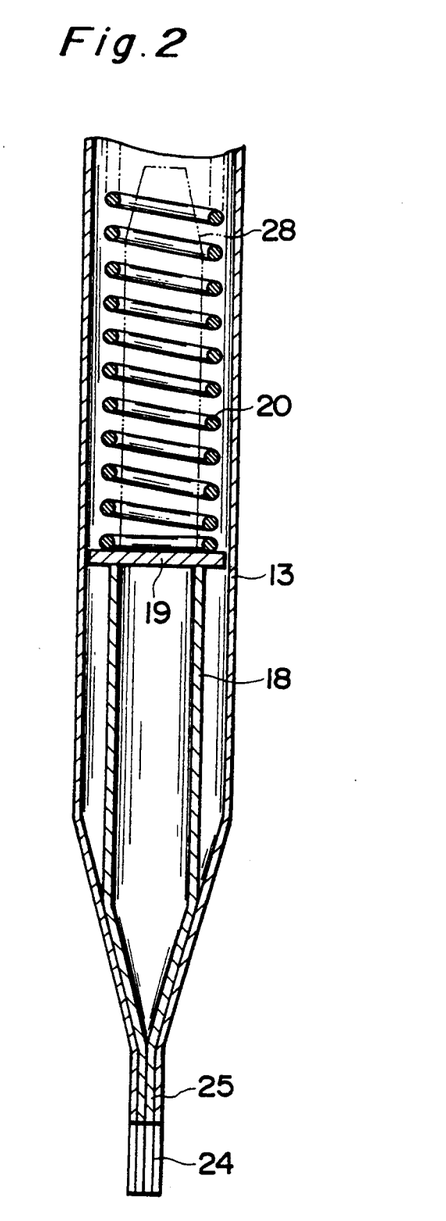
FIG. 2 is a sectional view of a sliding tube according to the present invention.

FIGS. 1 (a) and (b) are a partially sectional front view and a side view illustrating an example of a wheel suspension type front fork according to the present invention which is applied to a front wheel of a bicycle and FIG. 2 is a sectional view showing a sliding tube of the front fork.

In FIG. 1, numeral 10 denotes a steering tube having an upper end to which a handlebar is mounted by means of an extension system not shown. A lower end of the steering tube 10 is press fit into a middle portion of an upper crown 11 and fixed thereto. Upper portions of supporting tubes 12 are fixedly fit onto both arms 11a, 11a of the upper crown 11. An upper portion of a sliding tube 13 is slidably fit onto a lower portion of each of the supporting tubes 12.

More particularly, a sliding cylinder 14 made of polyimide resin is fixedly mounted on an upper half of an inner wall of the sliding tube 13, and the sliding tube 13 is fit onto the supporting tube 12 through the sliding cylinder 14 vertically slidably. A coupling tube or cylinder 15 is fixedly fit onto an upper outer wall of the sliding tube 13. Attached on an inner periphery of an upper end of the coupling cylinder 15 is a dust seal member 16 made of an elastic body and being in contact with the outer periphery of the supporting tube 12. Upper portions of the coupling cylinders 15 are coupled with each other by means of a cross member 29 and a fixing portion 29a for fixing a brake cable (not shown) is formed in an upper portion of the cross member 29. A brake base 17 for attaching a brake device not shown is provided on a lower portion of each of the coupling cylinders 15.

As shown in FIGS. 1(a) and 2, an inner tube 18 is disposed within a lower portion of each of the sliding tubes 13. An upper end of the inner tube 18 supports a receiving plate 19 and the receiving plate 19 supports a lower end of a coil spring 20. The coil spring 20 is disposed within the sliding tube 13 and an upper end of the coil spring 20 abuts against a stopper 21. The stopper 21 is pressed on a lower end surface of the supporting tube 12 by means of the resilient force of the coil spring 20. A lower end of a return coil spring 22 abuts against an upper surface of the stopper 21 and an upper end of the spring 22 abuts against a stopper pin 23. The stopper pin 23 is screwed into a lower portion of the coupling cylinder 15 and penetrates the sliding tube 13 and the sliding cylinder 14, so that the stopper pin 23 is projected in a lower portion of a long hole 12A formed vertically in the supporting tube 12 to thereby abut against the upper end of the return coil spring 22.

A lower portion of the inner tube 18 is drawn together with the sliding tube 13 to be formed into a cone and a lower end thereof is squeezed to be formed into a flat plate. A U-shaped groove 24 is formed in the flat plate portion to form an axle receiving portion 25.

Operation of the front fork according to the present invention is now described.

When a front wheel is attached to the axle receiving portion 25 through the axle and the force of shock is added to the front wheel, the sliding tube 13 moves up against the resilient force of the coil spring 20 and slides through the sliding cylinder 14 on the supporting tube 12. Accordingly, the force of shock can be absorbed by the sliding tube 13 and the coil spring 20.

Thereafter, the sliding tube 13 is pushed down by the resilient force of the contracted coil spring 20, while the stopper pin 23 abuts against the return coil spring 22 and moves down while pressing the spring 22, so that the sliding tube 13 can be returned to the original state gradually.

Further, as shown in FIG. 2, a damper 28 made of an elastic body may be disposed on the receiving plate 19.

The sliding tube 13 includes the inner tube 18 and the upper end surface of the inner tube 18 supports the receiving plate 19 constituting an shock absorber, Accordingly, it is not necessary to cut the inner wall of the sliding tube and form a step for the receiving plate 19. In addition, since the axle receiving portion 25 is integrally formed in the lower end of the sliding tube 13 and is reinforced by the lower portion of the inner tube 18, the mechanical strength thereof is remarkably improved.

A manufacturing method of the sliding tube 13 according to the present invention is now described.

Figure 3:
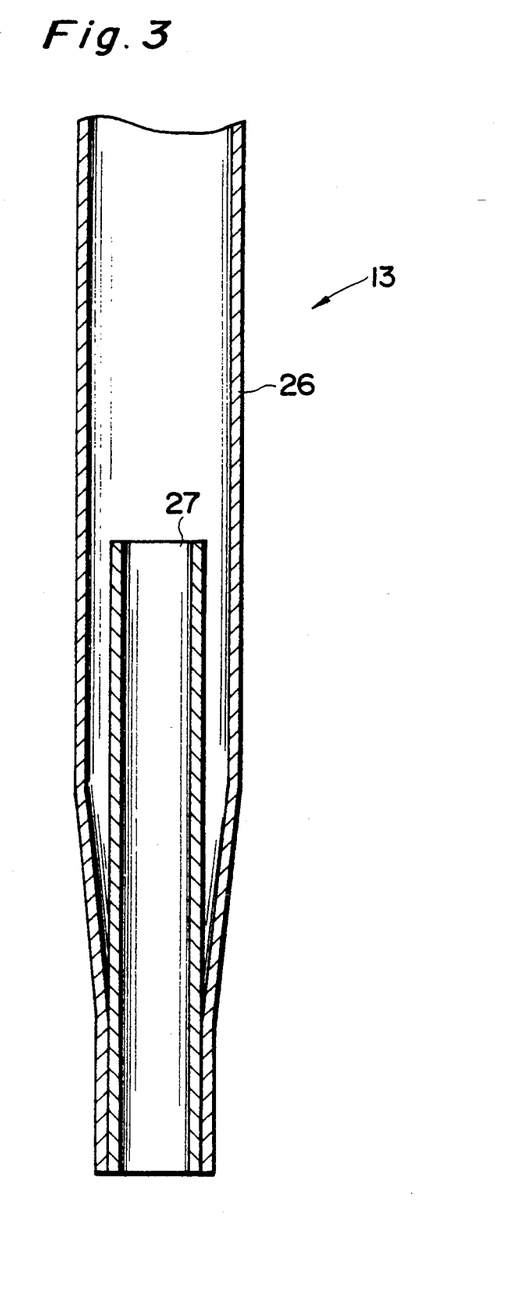
FIG. 3 is a sectional view illustrating a manufacturing method of the sliding tube of FIG. 2.

As shown in FIG. 3, commercially available tube material 26 and short tube material 27 having a small diameter are prepared.

Then, an end of the tube material 26 is drawn to form a cone and the tube material 27 is fit into the drawn end of the tube material 26.

The fit portion of both of the tube materials 26 and 27 is then pressed into a flat plate and as shown in FIG. 1 the U-shaped groove 24 is formed in the flat plate to form the axle receiving portion 25.

In this manner, since the sliding tube 13 of the present invention can uses the commercially available tube material and can be manufactured by simple work, any metal mold and facilities thereof are not required and any cutting work is also required. Accordingly, the sliding tube 13 can be mass-produced at a low cost. Further, even if any modification in design or modification occurs, it can be treated by selecting the tube material.

Figure 4A:
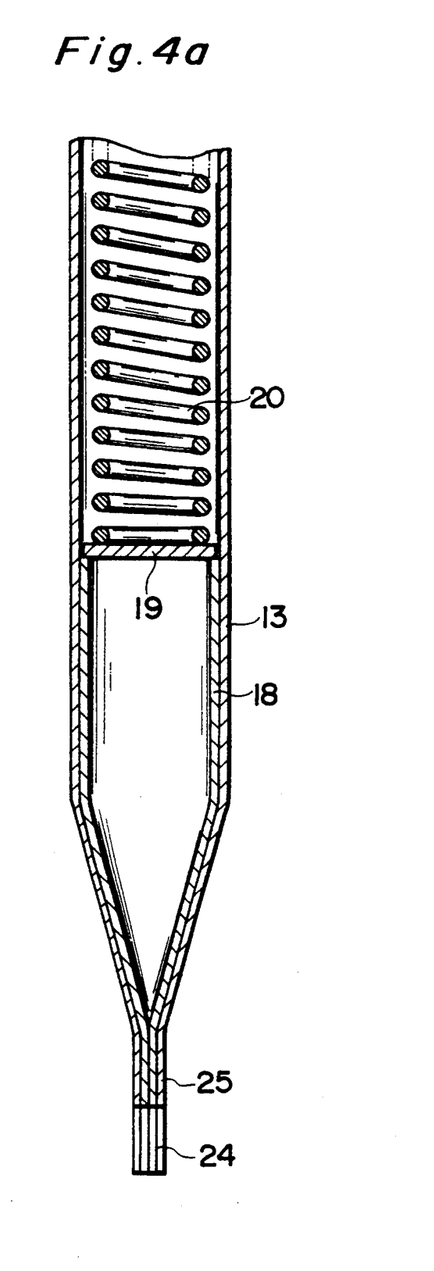
FIGS. 4(a) and (b) are a sectional view and a front view illustrating a sliding tube according to a modification of the present invention, respectively.
Figure 4B:
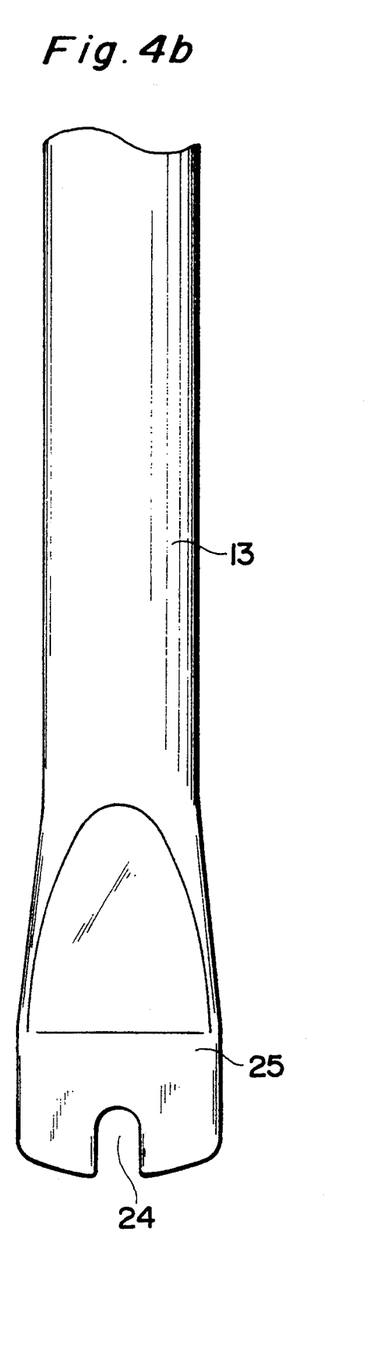

FIGS. 4(a) and (b) are a sectional view and a front view of a sliding tube according to a modification of the present invention, respectively. In this modification, the inner tube 18 is disposed in complete contact with the inner wall surface of the sliding tube 13. An upper end surface of the inner tube 18 supports the receiving plate 19 and a lower end of the inner tube reinforces the axle receiving portion 25.

Figure 5:
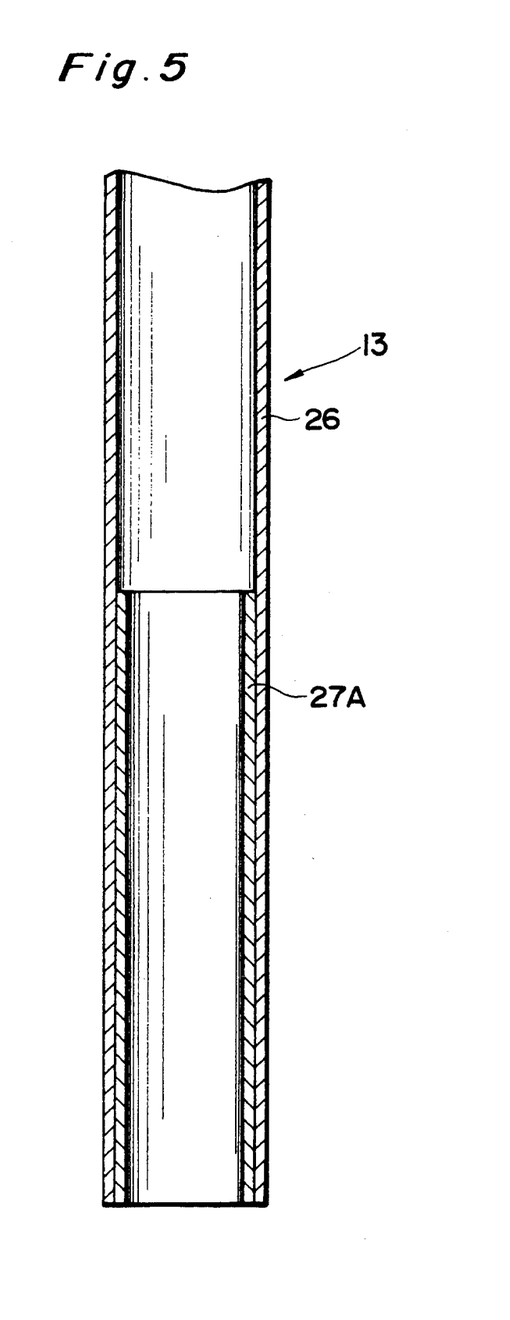
FIG. 5 is a sectional view illustrating a manufacturing method of the sliding tube of FIG. 4.

The sliding tube 13 of the modification is manufactured as shown in FIG. 5 by inserting tube material 27A having an outer diameter equal to an inner diameter of tube material 26 into the tube material 26 so that the tube material 27A comes into contact with an inner wall of the tube material 26 and squeezing one end of the tube materials 26 and 27A into a taper to form the axle receiving portion 25.

In the embodiment and the modification, the shock absorber is constituted by the coil spring 20, the receiving plate 19, the return spring 22 and the like, while the present invention can be applied to the front fork including a shock absorber utilizing an air spring, soft resin, an oil hydraulic mechanism or the like.

I claim:

1. A wheel suspension type front fork including a pair of supporting tubes fixedly mounted to the side of a steering tube, a pair of sliding tubes slidably fit onto said pair of supporting tubes and each having a lower end in which an axle receiver is formed, and shock absorbers disposed in said sliding tubes and said supporting tubes, wherein each of said sliding tubes comprises a dual-tube structure including an inner tube disposed fixedly in a lower portion of said sliding tube and having a lower end forming a reinforcement of said axle receiver and an upper end forming a support of said shock absorber, wherein said shock absorber includes a receiving plate supported by the upper end of said inner tube, a coil spring having one end which abuts against said receiving plate, a stopper which is elastically pressed to a lower end of said supporting tube by the other end of said coil spring, a return coil spring disposed within said supporting tube and having one end which presses said stopper to said coil spring, and a stopper pin which penetrates an upper portion of said sliding tube radially and is fixedly mounted thereto and which is movably engaged into a long hole formed axially in said support tube, the other end of said coil spring abutting against said stopper pin.

* * * * *